(12) United States Patent
Etter

(10) Patent No.: US 6,532,861 B2
(45) Date of Patent: Mar. 18, 2003

(54) CLAMPING DEVICE

(75) Inventor: Ernst Etter, Thalwil (CH)

(73) Assignee: Vischer & Bolli AG (DE)

( * ) Notice: Subject to any disclaimer, the term of this patent is extended or adjusted under 35 U.S.C. 154(b) by 39 days.

(21) Appl. No.: 09/783,401

(22) Filed: Feb. 15, 2001

(65) Prior Publication Data

US 2001/0027718 A1 Oct. 11, 2001

(30) Foreign Application Priority Data

Feb. 16, 2000 (DE) .......................... 100 06 847

(51) Int. Cl.⁷ ................................ F01B 31/00
(52) U.S. Cl. .......................... 92/86; 269/309
(58) Field of Search ................. 92/86, 130 R

(56) References Cited

U.S. PATENT DOCUMENTS

| | | | | |
|---|---|---|---|---|
| 4,577,847 A | * | 3/1986 | Schedwin ............... | 269/309 |
| 4,652,203 A | * | 3/1987 | Nakashima et al. ....... | 294/86.4 |
| 4,676,142 A | * | 6/1987 | McCormick et al. ...... | 279/4.06 |
| 4,906,123 A | | 3/1990 | Weskamp et al. ......... | 403/322 |
| 5,243,264 A | * | 9/1993 | Takada et al. ............. | 318/567 |
| 5,810,344 A | * | 9/1998 | Nishimoto ............... | 269/309 |
| 5,961,261 A | * | 10/1999 | Stark ........................ | 269/309 |

FOREIGN PATENT DOCUMENTS

| | | |
|---|---|---|
| DE | 4135418 | 5/1993 |
| DE | 196 36 375 | 3/1998 |
| DE | 298 04 730 | 7/1998 |
| EP | 0943396 | 9/1999 |

* cited by examiner

Primary Examiner—Edward K. Look
Assistant Examiner—Igor Kershteyn
(74) Attorney, Agent, or Firm—Liniak, Berenato & White, LLC

(57) ABSTRACT

The invention depicts and describes a clamping device for securing a draw-in bolt (12) on a machine table, a baseplate, or the like, having a piston (6) that is arranged movably in a cylinder bore (4) to form a pressure chamber (5), a cover (9) that closes off the cylinder bore (4) on the side opposite the pressure chamber (5), a receptacle (11) which is configured in the piston (6) and/or the cover (9) and into which a draw-in bolt (12) can be inserted, and a clamping mechanism in order to secure a draw-in bolt (12) in the receptacle (11), the clamping mechanism being actuable by displacement of the piston (6) between a clamped position into which it is pushed by spring elements (10) that are arranged in a spring chamber (2) provided between the piston (6) and cover (9), and a released position into which it can be brought by impingement of a hydraulic medium on the pressure chamber (5), which is characterized in that the spring chamber (2) is connected to the receptacle (11) by at least one runoff duct (19) through which the fluid that collects in the spring chamber (2) can run off into the receptacle (11).

8 Claims, 1 Drawing Sheet

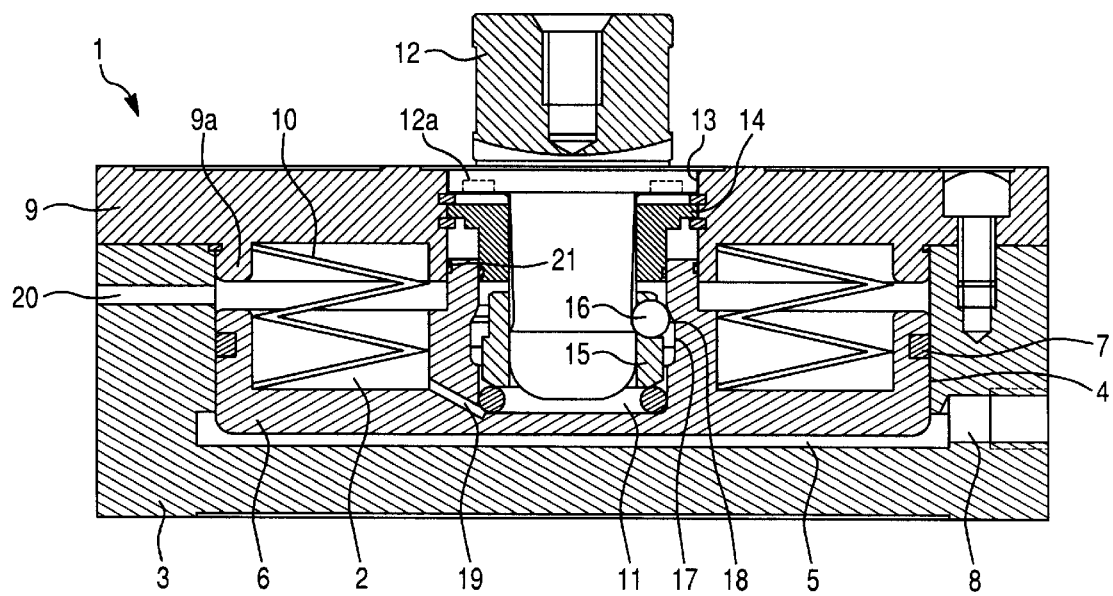

CLAMPING DEVICE

FIELD OF THE INVENTION

The present invention concerns a clamping device for securing a draw-in bolt on a machine table, a baseplate, or the like, having a piston that is arranged movably in a cylinder bore to form a pressure chamber, a cover that closes off the cylinder bore on the side opposite the pressure chamber, a receptacle which is configured in the piston and/or the cover and into which a draw-in bolt can be inserted, and a clamping mechanism in order to secure a draw-in bolt in the receptacle, the clamping mechanism being actuable by displacement of the piston between a clamped position into which it is pushed by spring elements that are arranged in a spring chamber provided between the piston and cover, and a released position into which it can be brought by impingement of a hydraulic medium on the pressure chamber.

BACKGROUND OF THE INVENTION

Clamping devices of this kind operating in mechanical/hydraulic fashion are known, for example, from DE 298 04 730 U1, and are used in practice to secure workpieces to the machine table of a machine tool. For this purpose, the workpiece that is to be machined is usually first clamped onto a carrier plate or carrier pallet; and then the entire unit comprising the carrier pallet and workpiece is clamped in place on the machine tool, by way of several draw-in bolts that are provided on the back side of the carrier pallet and are configured as centering elements, by inserting the draw-in bolts into the receptacles of the clamping devices provided on the machine table and clamping them in place therein.

With the known mechanical/hydraulic clamping devices on which the present invention is based, actuation of the clamping mechanism is accomplished by displacement of the piston between a clamped position and a released position; it is pushed into the clamped position by spring elements that are arranged in a spring chamber provided between the piston and the cover, and can be brought out of it into the released position by impingement of a hydraulic medium on the pressure chamber.

One problem that repeatedly occurs in practice is that a negative pressure is created because the piston frequently moves up and down in the spring chamber, and also that cooling fluid can penetrate into the spring chamber especially if wear occurs on the seals. This can cause jamming in the closed position if the fluid that has penetrated cannot escape quickly enough from the spring chamber, and the piston thus can no longer be pushed into the upper released position.

SUMMARY OF THE INVENTION

It is therefore the object of the invention to configure a clamping device of the kind cited initially in such a way that malfunctions can be avoided.

This object is achieved, according to the present invention, in that the spring chamber is connected to the receptacle by at least one runoff duct through which the fluid that collects in the spring chamber can run off into the receptacle.

As a result of the runoff ducts provided, according to the present invention, between the spring chamber and the receptacle for the draw-in bolt, cooling fluid that enters the spring chamber can flow off into the receptacle. In addition, the creation of a negative pressure in the spring chamber is also effectively prevented, since air can also, conversely, enter the spring chamber through the runoff duct.

The runoff duct advantageously terminates at its one end in the bottom region of the spring chamber, and at its other end in the bottom region of the receptacle; the spring-chamber end should lie higher up than the receptacle end. The result of this configuration is that practically no fluid can collect in the spring chamber, and that cooling fluid cannot come into contact with components that are present in the receptacle, or with the draw-in bolt, as it runs off.

According to a preferred embodiment, provision is made for an air delivery duct, through which compressed air can be blown into the spring chamber and from there via the runoff duct on into the receptacle, to be provided in the spring chamber. By way of the blowing-out function that is provided, the receptacle can be cleared of dirt and fluid that collects therein; the piston is only imperceptibly weakened by this design as compared to known approaches such as those known, for example, from DE 197 57 430 C.

BRIEF DESCRIPTION OF THE DRAWING

Regarding further advantageous embodiments, reference is made to the description below of an exemplary embodiment referring to the appended drawing, in which the single FIGURE shows, in longitudinal section, an embodiment of a clamping device according to the present invention with the draw-in bolt inserted and clamped in place.

DETAILED DESCRIPTION OF THE INVENTION

Clamping device 1, which can be mounted on a machine table, a baseplate, or the like, comprises a cylinder 3 that is open at its upper end and can be secured to the machine table by way of suitable clamping means. A piston 6 is inserted in axially movable fashion into cylinder bore 4 of cylinder 3 to form a pressure chamber 5, the annular gap between cylinder bore 4 and piston 6 being sealed by an O-ring 7. Opening into the bottom of cylinder bore 4 is a hydraulic medium duct 8, configured in cylinder 3, through which a hydraulic medium, for example oil, can be delivered to pressure chamber 5 through a delivery line provided in the machine table.

The open upper side of cylinder 3 is closed off by a cover 9 that is bolted onto cylinder 3 and held in centered fashion, for which purpose cover 9 has, on the cylinder side, a centering extension 9a that is dimensioned for a precise fit with the diameter of cylinder bore 4.

Provided between cover 9 and piston 6 is a substantially closed spring chamber 2 which is constituted substantially by an annular space in the upper side of the piston and in which is arranged a cup spring packet 10 that forces piston 6 downward in the direction of the bottom of cylinder bore 4.

Provided in the upper side of piston 6, opposite pressure chamber 5, is a blind hole that forms a receptacle 11 for a draw-in bolt 12 which is inserted into receptacle 11 through a passthrough hole 13 provided in cover 9. To facilitate and guide this insertion operation, a sleeve-shaped guide element 14 is provided in passthrough hole 13; and for exact positioning of draw-in bolt 12 in clamping device 1, the upper region of pass through hole 13 is dimensioned to fit a flange 12a of draw-in bolt 12.

A clamping mechanism is provided for securing draw-in bolt 12 in receptacle 11. It comprises, in a manner known per]

se, a ball cage 15, inserted into receptacle 11, in which several balls 16 are retained in radially displaceable fashion. With piston 6 in an upper, released position, balls 16 can slip outward into a groove 17 in the wall of receptacle 11 so that a draw-in bolt 12 can be inserted into and removed from ball cage 15; and with piston 6 in the lower, clamped position, they are prevented from slipping in that fashion by the wall of receptacle 11.

The clamped position, which is depicted in the, drawings, is assumed by piston 6 when pressure chamber 5 is pressureless and when piston 6 is pushed downward by cup spring packet 10. In this clamped position, an upper oblique surface 18 of groove 17 holds balls 16 in engagement with engagement bolt 12, so that the latter is clamped in place. When pressure chamber 5 is then impinged upon by a pressure medium via hydraulic medium duct 8, piston 6 is pushed upward, against the return force of cup spring packet 10, into its released position in which groove 17 allows balls 16 room to slip radially outward, so that draw-in bolt 12 can be removed from clamping device 1 and then also inserted back into it. The linear stroke of piston 6 is selected so that draw-in bolt 12 is pushed upward by the bottom of receptacle 11 in order to facilitate the removal of draw-in bolt 12.

As a result of the repeated upward and downward movement of the piston, a negative pressure can occur in spring chamber 2; and in addition, especially in the case of wear on O-ring 21 provided between piston 6 and cover 9, cooling fluid can penetrate into spring chamber 2. In order to prevent malfunctions resulting therefrom, a runoff duct 19 which connects spring chamber 2 to receptacle 11 is provided in piston 6. This runoff duct 19 opens at its one end into the bottom region of spring chamber 2, and at its other end into the bottom region of receptacle 11; the spring-chamber end lies higher up than the receptacle end, so that fluid can readily run off out of spring chamber 2.

Also opening into spring chamber 2 is an air delivery duct 20 through which compressed air can be blown into spring chamber 2 and from there via runoff duct on into receptacle 11, in order to clean dirt particles, etc. out of them.

What is claimed is:

1. A clamping device for securing a draw-in bolt (12) on a machine table or a baseplate, having a piston (6) that is arranged movably in a cylinder bore (4) to form a pressure chamber (5), a cover (9) that closes off the cylinder bore (4) on the side opposite the pressure chamber (5), a receptacle (11) which is configured in the piston (6) and/or the cover (9) and into which a draw-in bolt (12) is insertable, and a clamping mechanism in order to secure a draw-in bolt (12) in the receptacle (11), the clamping mechanism being actuated by displacement of the piston (6) between a clamped position into which it is pushed by spring elements (10) that are arranged in a spring chamber (2) provided between the piston (6) and cover (9), and a released position into which it is brought by impingement of a hydraulic medium on the pressure chamber (5), characterized in that the spring chamber (2) is connected to the receptacle (11) by at least one runoff duct (19) through which a fluid that collects in the spring chamber (2) runs off into the receptacle (11) and that an end of the runoff duct (19) at the spring chamber lies higher up than an end of the runoff duct (19) at the receptacle.

2. The clamping device as defined in claim 1, characterized in that the spring chamber has a bottom region and that the runoff duct (19) terminates in the bottom region of the spring chamber (2).

3. The clamping device as defined in claim 1, characterized in that the receptacle has a bottom region and that the runoff duct (19) terminates in the bottom region of the receptacle (11).

4. The clamping device as defined in claim 1, characterized in that at least one air delivery duct (20), through which compressed air is blown into the spring chamber (2) and via the runoff duct (19) on into the receptacle (11), opens into the spring chamber (2).

5. The clamping device as defined in claim 4, characterized in that the cylinder bore (4) is configured in a cylinder (3), and the air delivery duct (20) is configured in a wall of the cylinder.

6. The clamping device as defined in claim 1, characterized in that the spring chamber (2) is configured in any case partially in the piston (6).

7. The clamping device as defined in claim 6, characterized in that the runoff duct (19) is configured in the piston (6).

8. A clamping device for securing a draw-in bolt on a machine table or baseplate, said clamping device comprising:

a cylinder having a bore;

a piston axially displaceable in said cylinder bore, a pressure chamber being formed by said piston and said cylinder bore at one end of said cylinder bore;

a cover covering said cylinder bore at a second end opposite to said one end;

a spring chamber being formed by said piston and said piston cover;

at least one spring element disposed in said spring chamber;

a clamping mechanism, said clamping mechanism being actuated by displacement of said piston between a clamped position and a released position, said piston being displaceable into said clamped position by said spring elements and being displaceable into said released position by pressure in said pressure chamber;

a receptacle formed in one of said piston and said cover and into which the draw-in bolt is to be inserted; and at least one duct in fluid communication with said spring chamber and said receptacle, a first end of said duct terminating in said spring chamber at a location above a second end of said duct terminating in said receptacle.

* * * * *